3,122,520
METHOD OF MAKING SILICONE RUBBER FILLERS
Charles W. Lentz, Midland, Mich., assignor to Dow Corning Corporation, Midland, Mich., a corporation of Michigan
No Drawing. Filed Oct. 5, 1959, Ser. No. 844,191
6 Claims. (Cl. 260—46.5)

This invention relates to an improved wet method for making silica fillers.

It is known particularly from U.S. Patent No. 2,541,137, that finely divided silicas such as fume silicas and silica aerogels give silicone rubbers with improved physical strength when compared with fillers such as diatomaceous earth or titania. The finely divided silica fillers give rubbers which have, for example, tensile strengths from 800 to 1100 p.s.i., and elongations from 200 to 500 percent. These values represent the average properties of "commercial" silicone rubbers employing such fillers. These fillers when used alone, however, suffer from a serious disadvantage of a premature hardening of the polymer-filler mixture which occurs spontaneously and is known as crepe-aging.

Various means have been found to reduce or eliminate this crepe-aging difficulty and one of the best methods is to employ hydrophobic fillers which have at least .06 mol of organosilicon group (such as trimethylsilyl groups) per mol of silica, attached to the silica through SiOSi linkages. These fillers are described in the copending application of Leslie J. Tyler, Serial No. 460,773, filed October 6, 1954. In addition these Tyler type fillers impart better stress-strain properties to the vulcanized rubber than any other type of fillers presently employed. In general the commercial rubbers prepared from such fillers have tensile strengths in the range from 1500 to 2000 p.s.i. and elongations in the range from 500 to 800 percent.

The present invention relates to an improved method of making these Tyler type fillers.

It is the object of this invention to provide an improved method for making fillers for high strength silicone rubber. Another object is to provide a filler which imparts better handling properties to the unvulcanized silicone rubber stock. Other objects and advantages will be apparent from the following description.

In accordance with this invention a silica of improved reinforcing properties for silicone rubber is prepared by the steps comprising (1) heating an acid silica hydrosol having from .02 to .5 g. of $SiO_2$ per ml. of sol and having sufficient concentration of a strong mineral acid such that the pH of the sol is not greater than 1, at a temperature of from 50 to 250° C. and (2) thereafter mixing in the presence of a strong acid catalyst (A) said hydrogel with (B) an organosilicon compound of the group silanes of the formula $R_nSiX_{4-n}$ and siloxanes of the formula $$R_nSiO_{\frac{4-n}{2}}$$

in which R is of the group aliphatic hydrocarbon radicals of less than 6 carbon atoms, phenyl radicals, and $$R'CH_2CH_2-$$

where R' is a perfluoroalkyl radical of from 1 to 3 inclusive carbon atoms, X is of the group chlorine and alkoxy radicals of less than 6 carbon atoms, and $n$ is an integer of from 2 to 3 inclusive, said organosilicon compound being present in amount such that there is at least .06 organosilyl group per $SiO_2$ unit of the silica gel and (C) with sufficient organic solvent immiscible with water to convert said hydrogel into an organogel having a surface area between 100 to 650 square meters per gram as measured in the dry state.

The term "in the dry state" as employed herein means that the surface area is measured on the free flowing powder obtained by removing the solvent from the organogel.

As can be seen the process of this invention is a two step process, the first of which involves heating a silica sol under strong acid conditions. The second step involves mixing this hydrogel with the defined organosilicon compounds which react with the hydrogel to give a hydrophobic silica, and with sufficient organic solvent to convert the hydrogel to an organogel. The novelty of the process of this invention resides in the combination of the first step with the second step to produce improved fillers.

The essence of this invention resides in the discovery that better reinforcing fillers are obtained when a silica hydrosol is heated under strong acid conditions (hereinafter referred to as the "acid heating step"), prior to reacting the gel with the organosilicon compound (hereinafter called "the hydrophobing step" or "hydrophobing"). The fillers thereby produced are consistently better than if the sol is heated under alkaline or essentially neutral conditions prior to hydrophobing, or than if the sol is merely gelled and then hydrophobed directly without any preconditioning.

For the purpose of this invention any silica hydrosol having from .02 to .5 g. of $SiO_2$ per ml. of sol can be employed. The method employed to prepare the sol is immaterial. Thus one may prepare the sol, for example, by deionizing sodium silicate by any means such as by using ion exchange resins. Alternatively, one may prepare the sol by hydrolyzing a silane at low temperatures. Suitable silica hydrosols are available commercially and are sold under such trade names as Ludox and Nalcoag.

For the purpose of this invention it is essential that the sol be heated at a temperature of from 50 to 250° C. with sufficient strong mineral acid so that the pH of the sol during heating is one or less. Preferably, there should be sufficient mineral acid present so that the pH is essentially 0, that is so that the pH cannot be measured.

The precise heating time required varies with the temperature and acid concentration. The higher the temperature and the higher the acid concentration the shorter the heating time needed. The acid heating step must be continued until the hydrogel acquires a structure such that the final product after hydrophobing has a surface area in the dry state of from 100 to 650 square meters per gram as determined in accordance with the Brunauer, Emmett and Teller theory, Jour. Am. Chem. Soc., 60, 309 (1938).

Briefly the volume of N in cc. adsorbed at −196° C. per g. of sample was determined by measuring the difference in the amount of N and He adsorbed by a given weight of sample. The surface area in sq. meters per g. is then determined by solving the expression:

$$\frac{\text{cc. of adsorbed N at S.T.P. per g. of sample} \times 6.02 \times 10^{23} \times 16.2 \times 10^{-16}}{22{,}412 \times 10^4}$$

The surface area of the hydrogel at the conclusion of the acid heating step is immaterial provided it is such that the surface area of the product after the hydrophobing step is within the above range. Usually the surface area of the silica gel is reduced by the hydrophobing reaction since the organosilyl groups which thereby become attached to the surface of the gel increase the average particle size. Thus, the surface area of the hydrogel can be above 650 square meters per gram provided the hydrophobing treatment brings it within the 100 to 650 square meters per gram range. The only way, therefore, to determine the proper heating conditions during the acid heating step is to proceed with the hydrophobing step and then measure the surface area of the resulting product in the dry state. If the area is above 650 square meters per gram, then the acid heating conditions were too mild. If the area falls below 100 square meters per gram, then the acid heating conditions were too drastic.

If the surface area of the hydrophobed gel is above or below the range stated, unsuitable fillers are obtained.

For the purpose of this invention any strong mineral acid can be employed. This includes acids such as hydrochloric, hydrobromic, hydroiodic, sulfuric, nitric, and phosphoric. For the purpose of this invention the term "strong mineral acid" has reference to those acids which ionize to the extent of at least 25 percent in .1 N aqueous solution at 18° C.

The hydrogel formed as shown above is mixed with the defined organosilicon compounds and with sufficient water immiscible organic solvent to produce an organogel. This step must be carried out in the presence of a strong acid catalyst. In ordinary operation this can be the same acid which was employed in the acid heating step. If desired, however, one can first wash the hydrogel free of acid and then add back a strong acid either prior to, simultaneously with, or subsequent to the addition of the organosilicon compound. In the case where the organosilicon compound is a chlorosilane, the strong acid catalyst is generated in situ by hydrolysis of the silane or the chlorosilane may react directly with the hydroxyls of the silica gel. It should be understood that in the second step the above limitations on pH do not pertain and that it is only necessary that a catalytic amount of a strong acid be present in order to react the organosilicon compound with the silica gel. One may employ strong acids such as HCl, sulfuric or benzene sulfonic acids.

Reaction between the silica gel and the organi-silicon compound occurs spontaneously upon mixing the two. The temperature during this reaction is not critical and may be carried out at any temperature from say 30° C. to the reflux temperature of the solvent. The organosilicon compound reacts to produce a silica gel having organosilyl groups attached to the silica through SiOSi linkages. The reaction probably goes as follows:

$$R_nSiX + HOSi\equiv \rightarrow R_nSiOSi\equiv + HX$$

or $$R_nSiOH + HOSi\equiv \rightarrow R_nSiOSi\equiv + H_2O$$

In order to obtain satisfactory fillers it is necessary that a water immiscible organic solvent be present in sufficient amount to convert the hydrogel to an organogel. The organic solvent can be added prior to, simultaneously with, or subsequent to the addition of the organosilicon compound. That is the silica hydrogel can be first converted into an organogel by replacement of the water with an organic solvent. On the other hand the organosilicon compound and the organogel can be added simultaneously to the hydrogel. Under these conditions the reaction of the silica gel with the organosilicon compound and the replacement of the water in the gel with the organic solvent can occur simultaneously. Finally the organosilicon compound can be added prior to the organic solvent, in which case the hydrogel reacts with the organosilicon compound and the resulting product is then converted into an organogel by an addition of an organic solvent. In the latter two cases this conversion is accompanied by a phase separation, in which the hydrophobed silica gel passes into the organic solvent phase.

For the purpose of this invention any organic solvent immiscible with water can be employed. Suitable solvents include low molecular weight siloxanes such as hexamethyldisiloxane, octamethylcyclotetrasiloxane, diphenyltetramethyldisiloxane and trimethylsilyl endblocked dimethylpolysiloxane fluids. When a siloxane is employed as the solvent it serves both as a solvent and as a reactant with the silica hydrogel. In addition, suitable solvents include hydrocarbons such as toluene, xylene, heptane and other aliphatic hydrocarbon solvents and cyclohexane; ethers such as diethylether and dibutylether, and halohydrocarbon solvents such as methylene chloride, chloroform, ethylene chloride and chlorobenzene.

The amount of solvent is not critical so long as there is sufficient solvent to convert the hydrogel into an organogel. Preferably the solvent should have a relatively low boiling point, say 250° C. in order to facilitate its removal from the silica gel, the boiling point, however, is not critical since the solvent may be removed by centrifuging or by other suitable means.

The organosilicon compounds which are operative in this invention include:

Diethyldichlorosilane,
Allylmethyldichlorosilane,
Methylphenyldichlorosilane,
phenylethyldiethoxysilane,
3,3,3-trifluoropropylmethyldichlorosilane,
Trimethylbutoxysilane,
Sym-diphenyltetramethyldisiloxane,
Trivinyltrimethylcyclotrisiloxane,
Hexaethyldisiloxane, $$\underset{|}{\overset{CH_3}{C_3F_7CH_2CH_2SiCl_2,}}$$

Pentylmethyldichlorosilane, and
Divinyldipropoxysilane.

The viscosity of the siloxane reactants is not critical. Thus even high molecular weight siloxane gums can be employed since the acidic catalyst will cause splitting of the siloxane chain and reaction with the silica gel.

The organosilicon compound should be present in amount such that there is at least .06 organosilyl unit per $SiO_2$ unit of the silica gel. In other words there should be at least .06 $R_nSi$ group per atom of silicon in the silica gel with which the organosilicon compound is reacted. The upper limit of the amount of organosilicon compound is not critical since that in excess of the amount required to saturate the silica gel will merely act as a solvent for the system.

Whereas it is necessary that a water immiscible solvent be present for the purpose of this invention, it should be understood that the presence of water miscible solvents is not excluded. In fact, it is often desirable to have a water miscible solvent present in order to assist in the reaction of the organosilicon compound with the silica gel. Suitable solvents include alcohols such as ethanol, propanol, dioxane, tetrahydrofurane and the like.

After the hydrogel has been converted to the organogel the resulting product may be employed per se. That is, it may be employed directly in silicone rubber or in any other uses for which this type of product can be used such as, for example, in insulating material for thermal barriers and in life preservers where a light hydrophobic material is desirable. Alternatively one may remove the solvent from the organogel and use the resulting dry fluffy material for any of the above uses.

The following examples are illustrative only and should not be construed as limiting the invention which is properly delineated in the appended claims.

*Example 1*

The following example illustrates the desirable effect of a low pH during the acid heating stage in the preparation of the fillers of this invention.

A silica hydrosol having a concentration of .09 g. of $SiO_2$ per ml. of sol was divided into four samples of 370 ml. each. 36 percent by weight aqueous HCl was added to each sample in the amount shown in the table below. Each sample was refluxed 5 hours.

Each sample was then mixed with 185 ml. of isopropyl alcohol and 400 ml. of hexamethyldisiloxane. Each sample was stirred for 30 minutes and then the agitator was stopped, whereupon the material separated into two layers. The aqueous layer was drawn off and the organogel layer was heated to azeotrope off the remaining water. The remaining hexamethyldisiloxane was then removed and the resulting powdery product was compounded with a methylvinylpolysiloxane gum in an amount of 60 parts by weight filler and .5 part by weight tertiary-butylperbenzoate per 100 parts by weight siloxane gum. The plasticity of the resulting mixture was determined and the product was then vulcanized and thereafter cured for 4 hours at 250° C. The properties of the resulting rubber are shown in the table below.

| Ml. of 36% aqueous HCl | pH | Williams plasticity | Tensile in p.s.i. | Percent elongation at break |
|---|---|---|---|---|
| 185 | 0 | .164 | 2,050 | 753 |
| 34 | .3 | .118 | 1,870 | 820 |
| 4 | 1.7 | .097 | 1,495 | 810 |

*Example 2*

This example shows the difference between subjecting the sols to an acid heating step prior to hydrophobing (2) and hydrophobing directly without the acid heating step (1).

The silica sol employed in this example was a commercial product sold under the name of Nalcoag 1015 and was prepared by deionizing sodium silicate and allowing the product to age under conditions giving a high molecular weight stable sol.

(1) 560 ml. of this sol containing 90 g. of $SiO_2$ were mixed with 340 ml. of water, 400 ml. of concentrated hydrochloric acid and 500 ml. of isopropyl alcohol and stirred for a few minutes. 50 ml. of hexamethyldisiloxane were added and the mixture stirred one hour. 450 ml. additional hexamethyldisiloxane were then added, the composition separated into two layers and the organogel layer was separated and the remaining water and hexamethyldisiloxane were distilled.

The resulting hydrophobic silica filler was compounded with a vinylmethylpolysiloxane gum and with tertiary-butylperbenzoate in amount of 70 parts by weight filler and .5 part by weight tertiary-butylperbenzoate per 100 parts by weight polysiloxane gum. The product was then vulcanized for 10 minutes at 150° C. and then heated for 4 hours at 250° C. The properties are given in the table below.

(2) 375 ml. of the above silica sol containing 60 g. of $SiO_2$ were mixed with 225 ml. of water and 300 ml. of concentrated hydrochloric acid. The mixture was refluxed for 21 hours. The product was cooled to room temperature and 400 ml. of isopropyl alcohol and 100 ml. of hexamethyldisiloxane were added and the mixture stirred for one hour. The products separated into two layers and the organogel layer was separated and the water and excess hexamethyldisiloxane were removed by distillation. The resulting hydrophobic filler was dried and compounded into a rubber in identical manner shown above. The products of the resulting rubber are shown in the table below.

| | Williams plasticity | Tensile in p.s.i. | Percent elongation at break | Percent tension set |
|---|---|---|---|---|
| (1) | .072 | 360 | 370 | 0 |
| (2) | .146 | 2,040 | 600 | 5 |

*Example 3*

450 ml. of a silica hydrosol containing a .085 g. of $SiO_2$ per ml. of sol were mixed with 200 ml. of concentrated hydrochloric acid and refluxed for 3 hours. The product was cooled to room temperature and then mixed with 344 ml. of isopropanol and stirred for 1 hour. A mixture of 28 ml. of trimethylchlorosilane and .8 ml. of vinyldimethylchlorosilane was added. The mixture was stirred for one hour and then 550 ml. of toluene were added. The toluene layer containing the organogel was washed and then azeotroped and finally the toluene was removed. The resulting filler was dried to a powder.

This material gave excellent rubbers when compounded with silicone gums and vulcanized.

*Example 4*

333 ml. of a commercial stabilized silica sol containing .36 g. of $SiO_2$ per ml. of hydrosol were mixed with 27 ml. of water and 240 ml. of concentrated hydrochloric acid. The mixture was refluxed for 20 hours. The material was cooled to room temperature and then mixed with 600 ml. of isopropanol. After stirring 30 minutes 600 ml. of hexamethyldisiloxane were added. After 30 minutes the material separated into two phases and the organogel phase was removed, washed with water and azeotroped, and finally the hexamethyldisiloxane solvent was removed to give a hydrophobic powder having a bulk density of .15 g. of cc.

This material was an excellent filler for silicone rubber.

*Example 5*

400 ml. of a silica hydrosol having .09 g. of $SiO_2$ per ml. were mixed with 200 cc. of concentrated hydrochloric acid and refluxed for 3 hours. The mixture was cooled to room temperature and 200 ml. of isopropanol were added followed by 17 ml. of dimethyldichlorosilane. The mixture was stirred for ½ hour and 500 ml. of n-heptane were added. The mixture separated into 2 layers and the organogel was removed, washed with water, azeotroped and dried. The resulting powder was mixed with a methylvinylpolysiloxane gum in the amount of 60 parts by weight filler and .5 part tertiary-butylperbenzoate per 100 parts by weight gum. The mixture was vulcanized and cured 6 hours at 250° C. The resulting material had the following properties:

Williams plasticity _____ .153
Tensile in p.s.i. _____ 1888
Percent elongation at break _____ 663
Percent tension set _____ 7

*Example 6*

400 ml. of a silica hydrosol having .09 g. of $SiO_2$ per ml. were mixed with 200 ml. of concentrated HCl and refluxed for 3 hours. The mixture was cooled to room temperature and 200 ml. of isopropanol were added. The mixture was stirred and then 10.2 ml. of phenylmethyldichlorosilane were added and the mixture stirred for ½ hour. 25 ml. of trimethylchlorosilane were then added and the mixture stirred for ½ hour. 500 ml. of n-heptane were then added. The mixture separated into 2 layers. The organogel layer was separated, washed with water, azeotroped, and then dried. The resulting hydrophobic powder was milled with a methylvinylpolysiloxane gum in amount of 60 parts by weight filler, .5 part by weight of tertiary-butylperbenzoate and 100 parts by weight siloxane gum. The mixture was vulcanized and then cured for 6 hours at 250° C. The properties were as follows:

Williams plasticity _____ .144
Tensile in p.s.i. _____ 2000
Percent elongation at break _____ 723

*Example 7*

400 cc. of the hydrosol of Example 6 were mixed with 200 cc. of concentrated HCl and refluxed for 3 hours. 250 ml. of isopropyl alcohol were added after cooling the mixture to 70° C. 25 ml. of 3,3,3-trifluoropropylmethyldichlorosilane were then added and the mixture stirred for 45 minutes. 500 ml. of n-heptane were added. The mixture separated and the organogel layer was removed, washed with water, and azeotroped to remove the final trace of water.

The resulting product was an excellent filler for silicone rubber.

Example 8

83 ml. of a commercial silica hydrosol containing .36 g. of SiO₂ per ml. were mixed with 227 ml. of water and 240 ml. of concentrated hydrochloric acid. The mixture was refluxed for 20 hours. The resulting product was reacted with hexamethyldisiloxane in accordance with the procedure of Example 4. The hydrophobic filler so obtained had a bulk density of .13 g. per cc. It was an excellent filler for silicone rubber.

Example 9

Excellent fillers are obtained when a silica hydrosol having 0.4 g. of SiO₂ per ml. is mixed with sufficient anhydrous HCl gas to bring the pH of the hydrosol to 0.1 and the mixture is then heated at 80° C. for 24 hours and the hydrogel is then reacted with trimethylethoxysilane in amount of 0.5 trimethylsilyl group per SiO₂ unit in the silica gel, and the mixture is then converted to an organogel by the addition of toluene.

Example 10

Excellent fillers result when a hydrosol having .03 g. of SiO₂ per ml. is mixed with enough sulfuric acid to bring the pH of the sol to less than 1 and the sol is heated at 100° C. until the surface area of the resulting hydrogel is such that when the hydrogel is thereafter washed with ethanol to remove the water and then with methylene chloride to remove the alcohol and the resulting organogel is mixed with sufficient trimethylchlorosilane to give .08 trimethylsilyl group per SiO₂ unit in the gel, the resulting product has a surface area in the dry state of 200 square meters per gram.

Example 11

This example shows the reduction of surface area caused by hydrophobing and also the criticality of the surface area of the hydrophobed filler with respect to its reinforcing properties in silicone rubber.

A silica hydrosol having .06 g. of SiO₂ per ml. and four mols of HCl per liter was split into two parts.

Part 1 was refluxed at 100° C. until the sample gelled and then for 15 minutes more. A sample of the gel was washed with acetone to remove water and then dried. The surface area of the powder was 877 square meters per gram as measured by the above method.

The remainder of part 1 gel was reacted with hexamethyldisiloxane by the method of Example 1. The solvent was removed and the hydrophobed powder had a surface area of 755 square meters per gram. This hydrophobed filler gave unsatisfactory properties for high strength silicone rubber.

Part 2 was heated at 100° C. until it gelled and for 3 hours thereafter. A sample of gel 2 was washed with acetone and dried. The surface area was 657 square meters per gram.

The remainder of gel 2 was reacted with hexamethyldisiloxane in the manner of Example 1. The surface area of the hydrophobed powder was 476 square meters per gram. This filler gave excellent physical properties when incorporated in silicone rubber.

That which is claimed is:

1. A method of preparing a silica gel of improved reinforcing properties for silicone rubber which comprises (1) heating an acid silica hydrosol having from .02 to .5 g. of SiO₂ per ml. of sol and having sufficient concentration of a strong mineral acid such that the pH of the sol is not greater than 1, at a temperature of from 50 to 250° C. and (2) thereafter mixing in the presence of a strong acid catalyst (A) the hydrogel produced in (1) with (B) an organosilicon compound selected from the group consisting of silanes of the formula $R_nSiX_{4-n}$ and siloxanes of the formula $$R_nSiO_{\frac{4-n}{2}}$$

in which R is selected from the group consisting of aliphatic hydrocarbon radicals of less than 6 carbon atoms, phenyl radicals and $R'CH_2CH_2$— where R' is a perfluoroalkyl radical of from 1 to 3 inclusive carbon atoms, X is selected from the group consisting of chlorine and alkoxy radicals of less than 6 carbon atoms, and $n$ is an integer of from 2 to 3 inclusive, said organosilicon compound being present in amount of at least .06 organosilyl unit per SiO₂ unit of the silica gel, and with (C) sufficient organic solvent immiscible with water to convert said hydrogel into an organogel having a surface area in the dry state from 100 to 650 square meters per gram as measured by determining the volume of N in cc. adsorbed at −196° C. per g. of organogel by measuring the difference in the amount of N and He adsorbed by a given weight of sample and calculating the surface area by solving the expression $$\frac{\text{cc. of adsorbed N at S.T.P. per g. of sample} \times 6.02 \times 10^{23} \times 16.2 \times 10^{-16}}{22{,}412 \times 10^4}$$

2. The method in accordance with claim 1 where the organosilicon compound is hexamethyldisiloxane.

3. The method in accordance with claim 1 where the organosilicon compound is trimethylchlorosilane.

4. A method of preparing a silica gel of improved reinforcing properties for silicone rubber which comprises (1) heating an acid silica hydrosol having from .02 to .5 g. of SiO₂ per ml. of sol and having sufficient concentration of a strong mineral acid such that the pH of the sol is not greater than 1, at a temperature of from 50 to 250° C. and (2) thereafter mixing in the presence of a strong acid catalyst (A) the hydrogel produced in (1) with (B) an organosilicon compound selected from the group consisting of silanes of the formula $R_nSiX_{4-n}$ and siloxanes of the formula $$R_nSiO_{\frac{4-n}{2}}$$

in which R is selected from the group consisting of aliphatic hydrocarbon radicals of less than 6 carbon atoms, phenyl radicals and $R'CH_2CH_2$— where R' is a perfluoroalkyl radical of from 1 to 3 inclusive carbon atoms, X is selected from the group consisting of chlorine and alkoxy radicals of less than 6 carbon atoms, and $n$ is an integer of from 2 to 3 inclusive, said organosilicon compound being present in amount of at least .06 organosilyl units per SiO₂ unit of the silica gel, and (C) with sufficient organic solvent immiscible with water to convert said hydrogel into an organogel and (3) thereafter removing the solvent from the organogel whereby a powder having a surface area of from 100 to 650 square meters per gram as measured by determining the volume of N in cc. adsorbed at −196° C. per g. of organogel by measuring the difference in the amount of N and He adsorbed by a given weight of sample and calculating the surface area by solving the expression $$\frac{\text{cc. of adsorbed N at S.T.P. per g. of sample} \times 6.02 \times 10^{23} \times 16.2 \times 10^{-16}}{22{,}412 \times 10^4}$$

5. The method in accordance with claim 4 where the organosilicon compound is hexamethyldisiloxane.

6. The method in accordance with claim 4 where the organosilicon compound is trimethylchlorosilane.

References Cited in the file of this patent

UNITED STATES PATENTS

| Number | Name | Date |
|---|---|---|
| 2,475,253 | Pierce | July 5, 1949 |
| 2,589,705 | Kistler | Mar. 18, 1952 |
| 2,614,135 | Hirschler | Oct. 14, 1952 |
| 2,785,051 | Miller | Mar. 12, 1957 |
| 2,786,042 | Iler | Mar. 19, 1957 |
| 2,834,739 | Becker et al. | May 13, 1958 |